Dec. 26, 1950 M. A. GILL 2,535,129

LIGHTNING ARRESTER

Filed Jan. 16, 1950 2 Sheets-Sheet 1

Inventor

Merle A. Gill

By Fishburn & Mullendore

Attorneys

LIGHTNING ARRESTER

Filed Jan. 16, 1950 2 Sheets-Sheet 2

Inventor
Merle A. Gill
By Fishburn & Mullendore
Attorneys.

UNITED STATES PATENT OFFICE 2,535,129

LIGHTNING ARRESTER

Merle A. Gill, Rantoul, Kans., assignor to Harold D. Manuel, Kansas City, Mo.

Application January 16, 1950, Serial No. 138,785

2 Claims. (Cl. 175—30)

This invention relates to lightning arresters, particularly adapted for use on long rural telephone lines where heavy lightning discharges are likely to cause damage to the equipment along the line and to the central office equipment as well as to the cables.

Heretofore, it has been customary to use the usual carbon-type arrester, or arresters employing a fuse in conjunction with carbon blocks or self cleaning arresters.

The principal objects of the present invention are to provide a lightning arrester consisting of a coil of wire insulated in close proximity from a central core of a suitable ground wire or rod and having a free end of the coil wire attached to the telephone line whereby lightning discharging through the coil of wire will whip from one side of the coil to the other and be shunted to the ground through a ground wire from the line wire; to provide means for attaching the arrester to a telephone pole; to provide a device of this character unimpaired by rain, dust, ice, sleet or the like, and to provide a device of this character simple, economical to manufacture and efficient in operation.

In accomplishing these and other objects of the invention, I have provided improved details of structure, the preferred forms of which are illustrated in the accompanying drawings, wherein.

Referring more in detail to the drawings:

1 designates a lightning arrester embodying the features of my invention shown attached to a pole 2 provided with a block 3 for accommodating an insulator 4 as is the usual practice to which is attached a telephone line or the like 5.

Figure 2:
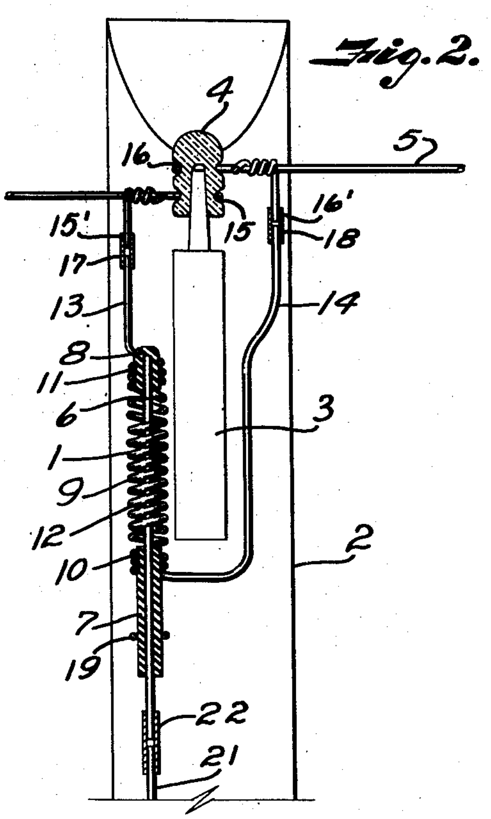
Fig. 2 is a vertical cross-sectional view of the device shown in Fig. 1.

The arrester 1 consists of a core 6 preferably of a conductive material such as metal, provided with spaced insulators 7 and 8, the insulator 8 being inserted over the end of the core as best illustrated in Fig. 2. The insulators may be any non-conductive material, such as rubber, fiber or the like. A length of wire line 9 is wound around the core 6 over the insulators 7 and 8. The wire is preferably of galvanized type and while I do not wish to be limited to any size I have found #14 satisfactory for my purpose. It will be noted as indicated at 10 and 11 the wire is wound tightly around the insulator sleeves 7 and 8 and is loosely coiled as indicated at 12 (Fig. 2) around the core and spaced therefrom between the insulators, the coil being approximately $\frac{1}{64}$ inch from the core, the free ends of the wire extending from the core as indicated at 13 and 14.

In ordinary practice the line is wound around a groove 15 of the glass insulator from one side of the pole and around the groove 16 from the other side of the pole with the ends of the wire connected in a suitable manner forming a loop adjacent the glass insulator so that there is a through connection to the line.

When it is desired to attach one of the lightning arresters to a telephone line, the line is cut on the loop and the free ends 15′ and 16′ secured to the ends 13 and 14 of the arrester by couplings 17 and 18.

Figure 1:
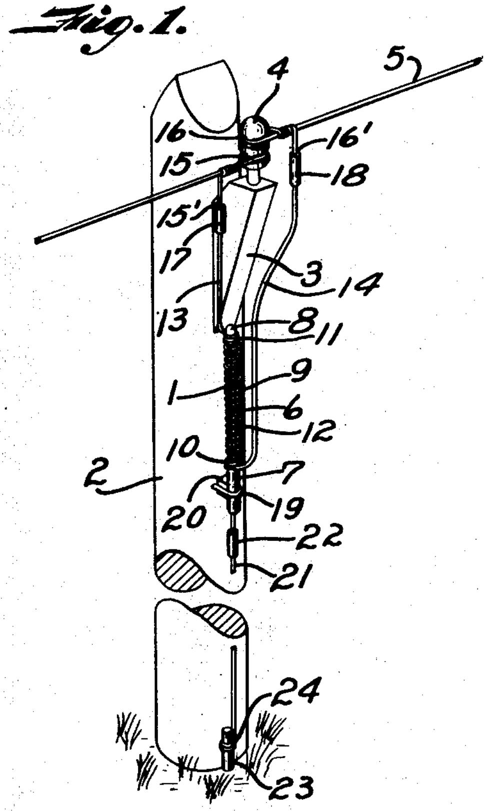
Fig. 1 is a perspective view of my lightning arrester installed on a telephone line.

The arrester may be secured to the post 2 by a staple or the like 19 and spaced therefrom by a block 20 to retain the arrester a slight distance away from the pole. A ground wire 21 is secured to the lower end of the core 6 by a coupler 22 and extends downwardly along side of the pole and is secured to a ground rod 23 as indicated at 24 (Fig. 1). If desired the ground wire 21 may be run into the ground without use of the ground 23.

When lightning strikes the line 5 on the right side of the pole, it will travel down the free end of the arrester 14 to the coil 12 and be dissipated back and forth between the coil 12 and the core 6 and be shunted through the core to the ground wire. The lightning will be so dissipated that what discharge travels through the free end 13 of the arrester back to the line on the opposite side of the pole will cause no damage to the equipment along the line or in the central office.

Figures 3, 4:
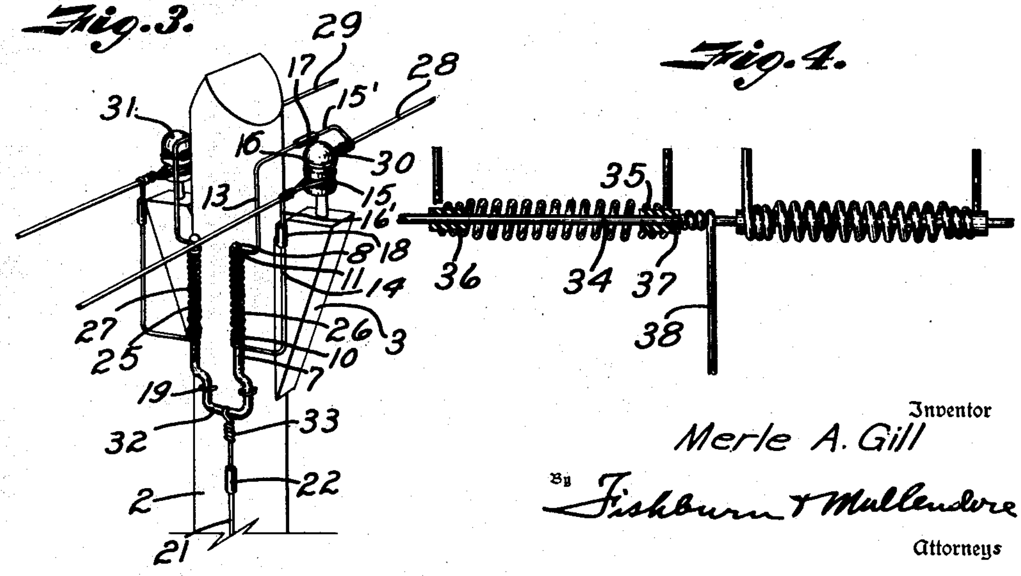
Fig. 3 is a perspective view of a modified form of the invention wherein a double arrester is used for accommodating two lines.
Fig. 4 is an elevational view partly in cross section of a plurality of coils of lightning arresters assembled on a core and having a single ground wire.

In Fig. 3 I have shown a double arrester comprising a U-shaped core 25 having wires 26 and 27 coiled around the arms of the U-shaped core with their free ends attached to lines 28 and 29 on each side of the insulators 30 and 31, the lines having been cut and the free ends secured to insulators.

The principal object of this form of the invention is to provide a double arrester for two lines or when desired for use on one line the arm 32 of the U-shaped core, may be cut on either side of the ground wire 33 and utilized for a single line as desired. The operation of this form of invention is the same as in the preferred form, the coil of the arrester being made in the same manner and insulated from the core.

Fig. 4 shows a core 34 having a plurality of wires 35 wound therearound and insulated therefrom by insulating sleeves 36 and 37 and having a lead line 38 to a ground (not shown).

Figure 5:
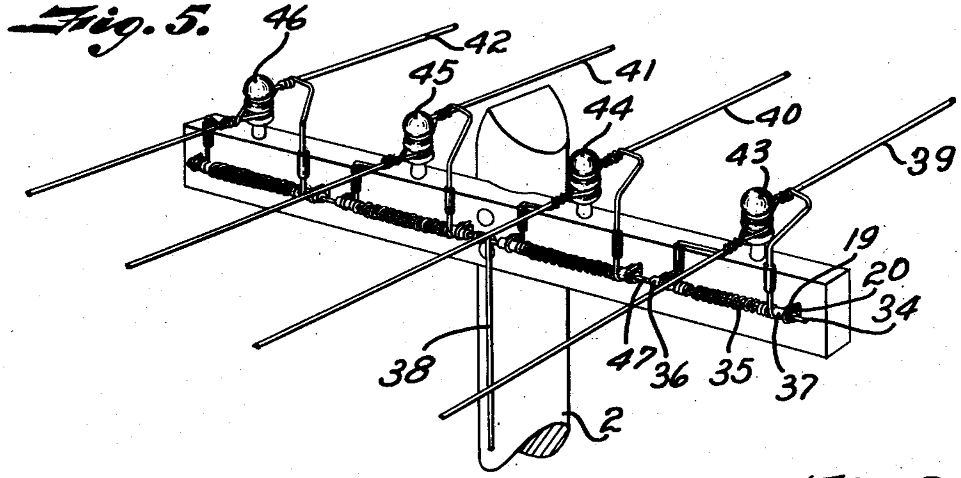
Fig. 5 is a perspective view of a plurality of my lightning arresters shown for accommodating a plurality of lines on one pole.

In Fig. 5 I have shown a form of the invention as shown in Fig. 4 attached to lines 39, 40, 41 and 42, the hookup of the arrester being the same as in the preferred form of the invention to insulators 43, 44, 45 and 46, a wire line 38 leading to a ground rod (also not shown). The plurality of arresters shown are attached to the core in this form of the invention in a manner so that the core may be cut between the arresters as indicated at 47 and the devices used as a single unit as desired.

Operation of the polyphase form of the arrester is the same as in the preferred form.

Figure 6:
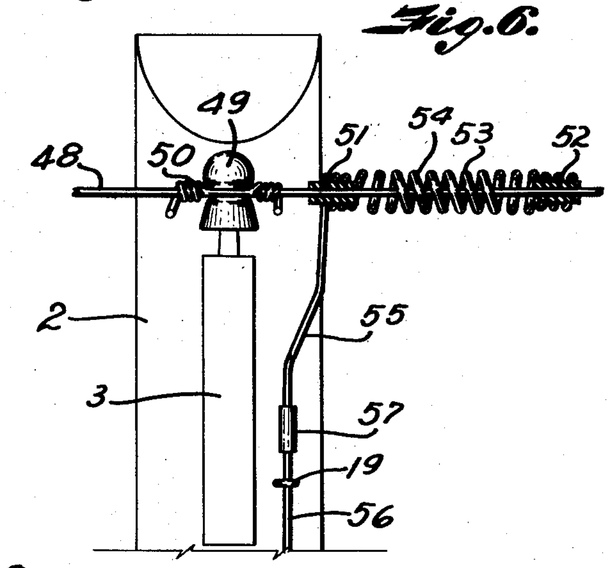
Fig. 6 is a modified form of the invention showing the coil attached to the telephone line.

In Fig. 6 is shown a modified form of the invention having a telephone line 48 secured to an insulator 49 by a wire 50 as is the usual practice, the arrester in this form consists of insulating sleeves 51 and 52 placed over the telephone line 48 and a wire 53 having its free end wound around the insulator sleeve 52 away from the pole 2 and a coil portion loosely wound around the telephone line as indicated at 54 between the insulators and tightly around the insulator 52 with its free end 55 secured to a ground wire 56 by a coupler 57. In this form of the invention should lightning strike on either side of the pole 2, discharge will be shunted back and forth from the coil wire to the line and also shunted down the ground wire to be dissipated thereto.

Figure 7:
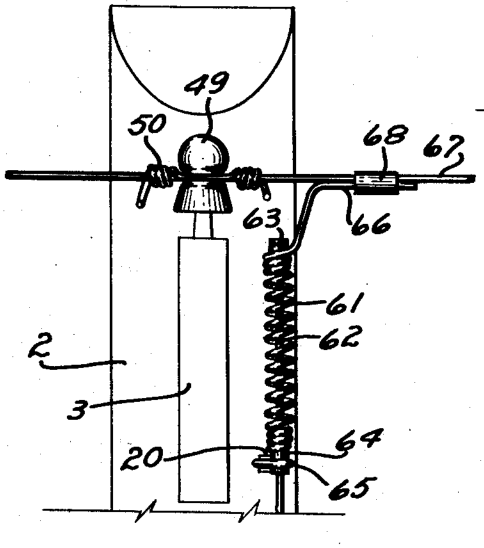
Fig. 7 is a further modified form of my invention showing the lightning arrester attached to a pole and having one end of the coil attached to the telephone line for shunting the lightning discharge directly to the ground wire.

In Fig. 7 is shown a further modification of the attachment of an arrester to a line. In this form a wire 61 is loosely coiled around the core 62 between the insulators 63 and 64, the arrester being secured to the pole 2 by a staple 65. The free end 66 of the wire of the arrester is secured to the telephone line 67 by a coupling member 68. In this form of the invention should lightning strike the line 67, it will discharge to the wire line 61 and be dissipated by shunting back and forth from the coil to the core and also to a ground wire (not shown).

It will be obvious from the foregoing that I have provided an improved lightning arrester wherein the parts may be quickly and easily attached to a single telephone line or a polyphase type and which will be efficient for dissipating the electrical discharge from the lightning through the arrester and to the ground, thereby effecting a great saving in damage to equipment along the line as well as the central office.

What I claim and desire to secure by Letters Patent is:

1. A lightning arrester for wire lines supported above ground by poles or the like comprising, spaced pieces of insulating material on said line adjacent said pole, a wire having one end wound tightly around the insulator spaced farthest from said pole, said wire being loosely coiled around said line between said insulators and spaced from said line and the turns of the coils being spaced from each other, said wire being tightly wound around said insulator adjacent to said pole, and means for attaching one free end of said wire to a ground wire.

2. A lightning arrester for wire lines supported above ground by poles or the light comprising, insulators sleeved on said line adjacent said pole, and spaced from one another, a wire having one end wound tightly around the insulator spaced farthest from said pole, said wire being loosely coiled around said line between said insulators and spaced from said line, said wire being tightly wound around the other insulator, and means for grounding the free end of said wire adjacent said pole.

MERLE A. GILL.

REFERENCES CITED

The following references are of record in the file of this patent:

UNITED STATES PATENTS

| Number | Name | Date |
|---|---|---|
| 287,092 | Brennan | Oct. 23, 1883 |
| 745,114 | Nicholas | Nov. 24, 1903 |
| 1,652,913 | Skonier | Dec. 13, 1927 |